United States Patent [19]

Saegusa

[11] 4,443,080
[45] Apr. 17, 1984

[54] EXPOSURE CONTROL APPARATUS BASED ON MULTIMETERING SYSTEM

[75] Inventor: Takashi Saegusa, Sagamihara, Japan

[73] Assignee: Nippon Kogaku K.K., Tokyo, Japan

[21] Appl. No.: 319,085

[22] Filed: Nov. 6, 1981

[30] Foreign Application Priority Data

Nov. 12, 1980 [JP] Japan ............................... 55-159166
Nov. 12, 1980 [JP] Japan ............................... 55-159167

[51] Int. Cl.³ .......................... G03B 7/28; G03B 7/08
[52] U.S. Cl. ................................................... 354/432
[58] Field of Search ........................................ 354/31

[56] References Cited

U.S. PATENT DOCUMENTS 4,306,787 12/1981 Fukuhara et al. ................ 354/31 R
4,309,091 1/1982 Fukuhara et al. ................ 354/31 R
4,364,650 12/1982 Terashita et al. ................. 354/31 R Primary Examiner—Russell E. Adams
Attorney, Agent, or Firm—Fitzpatrick, Cella, Harper & Scinto

[57] ABSTRACT

Exposure control apparatus has a multimetering system in which an object plane is divided into a plural areas to produce a plural number of photometric outputs. From the outputs one photometric output is selected as a reference output for determining the exposure value. The reference value is further changed according to the characteristic of the object field in such manner as to provide the most optimum exposure for it.

7 Claims, 10 Drawing Figures

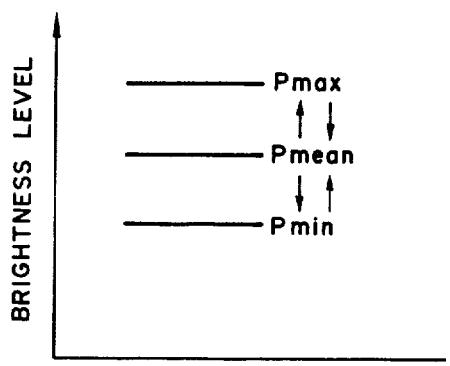
FIG. 1A
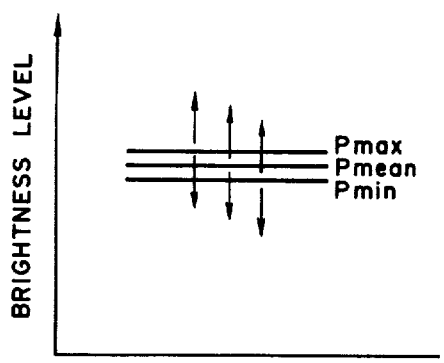
FIG. 1B
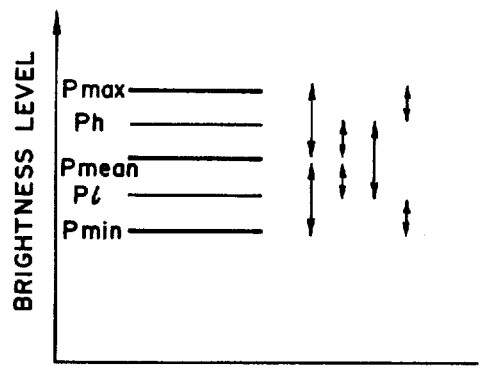
FIG. 1C
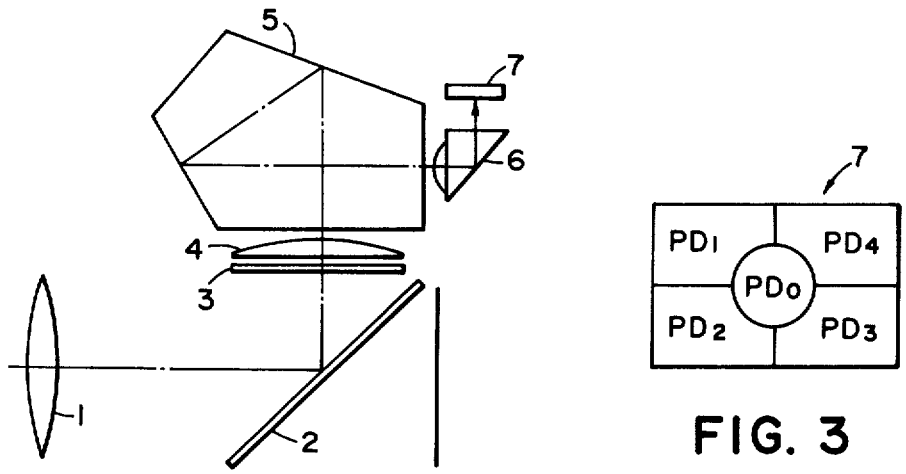
FIG. 2
FIG. 3

EXPOSURE CONTROL APPARATUS BASED ON MULTIMETERING SYSTEM

BACKGROUND OF THE INVENTION

1. Field of the Invention

The present invention relates to an exposure control apparatus based on the known multimetering system according which an object field is divided into a plural number of areas and the areas are photometrically measured individually.

2. DESCRIPTION OF THE PRIOR ART

When one takes a picture under backlight conditions using a conventional camera, it is required to suitably correct the exposure value automatically determined. According to the prior art this correction is made relying solely on the photographer's experience with the ASA sensitivity correction dial or a particularly provided correction switch. In the former case, considering the state of the backlighted object, the dial is reset toward overexposure by one or two steps. In the latter case, by turning the correction switch, the exposure value is corrected to a predetermined value which corresponds to one and half step overexposure. It is true that these correction methods have some effects for obtaining good pictures. However, the result obtainable from such correction varies case by case according to the state of the object at that time. To obtain consistently good results from such correction, a high degree of experience and skill is required. The same may be said of the case in which the correction has to be made toward underexposure, for instance, to take a picture of such scene including a spotlighted object.

Some attempts have already been made to automatically determine the correction of exposure necessary for the above mentioned cases without relying on the photographer's experience and skillfulness. A potential solution to the problem is to use a plural number of photo receptors as proposed by U.S. Pat. No. 4,214,826 (the counterpart of which is DAS No. 2,632,893) and U.S. Ser. No. 123,209 (the counterpart of which is DOS No. 3,007,575).

According to the known solution, a multiple light measurement of a scene to be taken is carried out using a plural number of photoelectric elements. From the photometric outputs of the multiple metering there are obtained by calculation about three different reference outputs (the maximum photometric output Pmax, the mean photometric output Pmean and the minimum photometric output Pmin). One of the three reference outputs is selected based on the result of classification of the object into one of the predetermined categories. This method is more effective to correct the exposure value than the conventional correcting method relying on the photographer's experience and skill. However, this correcting method employing a multimetering skill involves some problems. For some objects there occurs erroneous classification of the object which results in misselection of the reference output. Furthermore, when the main object is smaller than one divisional area of the divided object field, it is impossible to obtain any correct information of brightness. For example, this is applied to the case where the object to be taken is a single flower standing against the white background. In this case, all of the measured outputs will have the same value which corresponds to the brightness of the white background only. The camera, therefore, perceives the scene merely as a flat object. In this case, almost the same exposure value is automatically set whichever the apparatus may select from the three reference outputs, Pmax, Pmean and Pmin. In any case, the result is underexposure. This erroneous exposure may be corrected to some extent by additionally using manual film sensitivity changing means such as the above mentioned ASA correction dial. However, in such case, when the difference in brightness between the areas becomes large, a doubled correction may be made by the manual dial correction on one side and by the automatic correcting function of the camera itself on the other hand. Such doubled correction will lead to overexposure which is entirely opposite to that as given by automatic correction only.

SUMMARY OF THE INVENTION

Accordingly it is the primary object of the present invention to provide an exposure control apparatus which enables and always obtains correct exposure value for any of the object scenes classified into one of the categories predetermined in respect of brightness distribution characteristics.

According to the invention there is provided an improved exposure control apparatus in which one reference output is selected from the photoelectric outputs obtained by multimetering to be a basic information for determining the expornre, and the selected reference value can be changed according to the characteristic of the object field to be taken so as to provide the optimum exposure without deviating from the conditions necessary for obtaining a most proper exposure value for the object.

The improved exposure control apparatus according to the invention comprises means for indicating the direction in which the exposure value should be changed, and means for changing the selected reference output in such manner as to change the exposure value in the indicated direction within a certain range of conditions determined on the basis of the plural number of the measured photoelectric outputs.

Other and further objects, features and advantages will appear more fully from the following description taken in connection with the accompanying drawings.

BRIEF DESCRIPTION OF THE DRAWINGS

FIGS. 1A–1C show some examples of brightness level;

FIG. 2 is a schematic illustration of a photometering optical system according to the invention;

FIG. 3 is a plan view of an example of photo electric elements;

DESCRIPTION OF PREFERRED EMBODIMENTS

Figure 4:
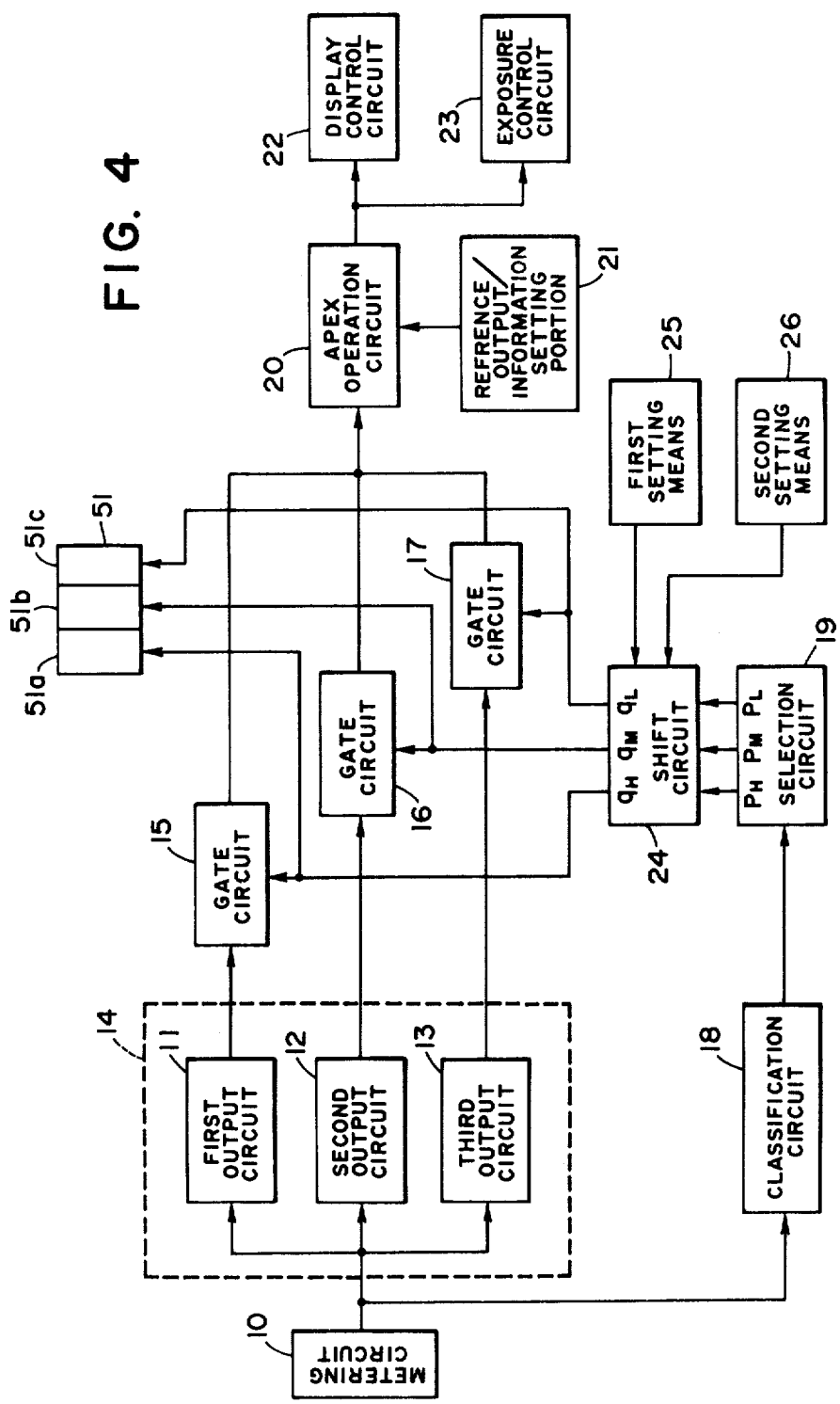
FIG. 4 is a block diagram showing an embodiment of the invention.

Preferred embodiments of the invention are described hereinafter with reference to the accompanying drawings of which FIGS. 1 to 3 illustrate the basic conception of the present invention and FIGS. 4 to 7 illustrate some preferred embodiments thereof.

Before entering the detailed description of the preferred embodiments, I will describe at first the principle of the multimetering system on which the present invention has been made.

Image forming planes or picture planes of various scenes to be taken may be classified into categories according a predetermined classification system based on the information brightness and/or the information of position sections or areas of regarding each picture plane. Each picture plane falls within any one of the determined categories. When the picture plane has different values of brightness for different areas of the plane, the category gives information as to which brightness value should be selected to obtain the most proper exposure value for the scene as a whole. According to the above mentioned prior art multimetering system disclosed in U.S. Ser. No. 123,209, the picture planes are categorized according to the information of brightness and the information of position. However, other classification system may be used. For example, classification may be made according to the brightness of the main light source among a plural number of divisional picture areas individually measured. One reference output is selected according to the category to which the brightness of the main light source belongs. Let Pmax denote the maximum value of the photometeric outputs, Pmin the minimum value and Pmean the mean value of the divisional photometric outputs. Then, classification may be made in the following manner in relation to Exposure value Ev or Luminance value Bv in the terms of APEX notation:

(1) $Pmax \geq 9$:

This is the case where the scene includes an object of very high brightness such as the sun, a bright cloud or a clear sky. In such case, the main object to be taken is often present on the low brightness side of the scene. Therefore, to prevent the main object from being darkened, the exposure value has to be adjusted to the brightness near the minimum value Pmin. One may be concerned lest the area of high brightness should become too bright and disappear. However, film has a latitude and therefore a relatively good exposure can be obtained even for the high brightness area.

(2) $0 \leq Pmax < 9$:

Examples of this case include ordinary outdoor or indoor scenes in the daytime and scenes in the evening. In this case, if the exposure is adjusted only to the main object at which the photographer aims, then other objects than the main object present in the scene will be too darkened or brightened which results in an unsatisfactory photo picture. To prevent it, the exposure has to be done considering the brightness of the whole scene. Therefore, in this case, the exposure value is adjusted to the brightness near the mean value Pmean.

(3) $Pmax < 0$:

In every night scene, the main object to be taken is present at the high brightness part. The exposure value is therefore adjusted to the brightness near the maximum value Pmax.

As for the brightness on which the exposure control should be based to obtain a proper exposure for various objects under various conditions, it has been found that all of the brightness values for exposure control can be converged to the following three levels of brightness:

The first brightness level is a level existing between the maximum value among measured photoelectric outputs and the mean value of the same outputs. The second brightness level is a level nearly equal to the mean value of the photometric outputs. The third brightness level exists between the mean value and the minimum value of the photometric outputs. The mean value can be represented approximately by average value, mid value or highest frequency value.

As will be understood from the foregoing, if a picture plane, that is, a scene has been put into a wrong category and any improper brightness level has once been selected for the scene, the possibility of obtaining a proper exposure for the scene can be increased by selecting anew any one of the first to third brightness levels and substituting it for the previously selected one. Misselection of brightness level is possible for the reasons previously mentioned. Therefore, reselection of the brightness level is an effective way to prevent any erroneous exposure caused by such misselection of the brightness level. The reselection of brightness level should be done considering the following conditions:

When the brightness level once selected according to the category for a scene is the mean value Pmean, such brightness level should not be reselected which makes the exposure adjusted to a higher brightness level than the maximum value Pmax or a lower brightness level than the minimum value Pmin. If such brightness level is reselected, then the object present on the low brightness side or on the high brightness side of the scene may be completely lost even when the latitude of film is taken into account.

Therefore, in the case where the first selected brightness level is Pmean, it is essential not to reselect any brightness level higher than Pmax or lower than Pmin.

In the multimetering apparatus, Pmin is selected for a backlighted object and Pmax is selected for a spotlighted object. In case of such scene, the main object which the photographer aims at, has a brightness level corresponding to Pmin or Pmax. Therefore, it is not only unnecessary but also meaningless to change the selected brightness to a brightness level higher than Pmax or lower than Pmin by reselection. Therefore, in the case where the first selected brightness level is Pmin or Pmax, it is only necessary to make reselection of brightness toward Pmean exclusively.

FIG. 1A shows the possibility of brightness level reselection in the above cases. When the first selected brightness level is Pmean, reselection is done toward Pmax or Pmin When the first selected brightness level is Pmin or Pmax, reselection is made toward Pmean. In carrying out this last mentioned reselection of brightness level, the photographer may give his camera instructions to indicate the direction of reselection, overexposure direction or underexposure direction. In response to the instructions, the camera automatically carried out the necessary reselection, for example, Pmean→Pmax or Pmean→Pmin. In this manner, a proper exposure can be attained because the brightness level providing a proper exposure is converged into any one of the above mentioned three brightness levels, first, second and third brightness levels.

To obtain better exposure there may be provided intermediate brightness levels between the first and second levels and between the second and third levels as porposed by U.S. Ser. No. 123,209. FIG. 1C shows an example of such intermediate brightness levels. In FIG. 1C, an intermediate level ph is provided between Pmax and Pmean and another intermediate level Pl is provided between Pmean and Pmin. As shown in FIG.

1C, in this case, one step level change such as Pmean→ph or two step level change such as Pmin→Pmax may be carried out as desired.

However, there are such cases where the above described reselection of brightness level has no remarkable effect to further correct the exposure value. A daffodil arranged in a slim vase standing against white or black background is an example of such case. In this scene, the background is uniform in brightness. As shown in FIG. 1B, there is only a small difference in brightness level between Pmax and Pmean and between Pmean and Pmin. Therefore, no remarkable effect will be obtained by reselecting the brightness level in the same manner as above. In such case, a remarkable effect to correct the exposure value can be obtained by adjusting the exposure value to a new brightness level as given by adding or subtracting a determined level to or from Pmax, Pmean or Pmin.

FIG. 2 illustrates an embodiment of a photometering optical system according to the invention.

In FIG. 2, the optical system comprises a taking lens 1, mirror 2, finder screen 3, condenser lens 4, pentaprism 5 and prism 6 formed with a convex lens portion. An image on the finder screen 3 is focused on a photo receiving element 7 through the prism 6.

FIG. 3 shows the structure of the photo receiving element 7.

The photo receiving element 7 is composed of a combination of a plural number of photoelectric elements $PD_0-PD_4$ or the photo receiving element 7 is divided into a plural number of sectional areas $PD_0-PD_4$ to measure light from a plural number of divided areas of a secne to be taken.

An embodiment of the present invention will be described hereinafter with reference to FIG. 4 showing a block diagram thereof.

In the block diagram, a metering circuit 10 includes the above mentioned photo receiving element 7 for measuring the light of the respective divided areas of a scene individually. The metering circuit 10 produces individual measured photoelectric outputs $P_0-P_4$ related to the divided areas of the scene. These measured outputs are outputs logarithmically compressed and therefore each of the outputs corresponds to an Apex value of object brightness, that is, Luminance value Bv.

14 is a reference output generating circuit composed of first, second and third output circuits 11, 12 and 13 for generating first, second and third reference outputs respectively. The first output circuit 11 selects or calculates an output from the outputs $P_0-P_4$ of the metering circuit 10 so as to produce a reference output on the high brightness side such as Pmax. The second output circuit 12 generates an averaged reference output such as Pmean. Similarly, the third output circuit 13 generates a reference output on the low brightness side such as Pmin.

18 is a classification circuit for examining the respective outputs $P_0-P_4$ from the metering circuit 10 and determining the category to which the scene to be taken is to belong. In other words, the classification circuit 10 classifies the scene into any one of the predetermined categories. A concrete form of the classification circuit 18 is disclosed in detail in the above mentioned U.S. Ser. No. 123,209.

Designated by 19 is a selection circuit for generating signals PH, PM, PL by means of which gate circuits 15, 16, 17 are selectively operated according to the result of classification made by the classification circuit 18.

When the gate circuit 15 is opened, the output from the first output circuit 11 is allowed to enter an Apex operation circuit 20. Similarly, when the gate 16 is opened, the output from the second output circuit 12 is transmitted to the Apex operation circuit 20 and when the gate 17 is opened, the output from the third output circuit 13 is transmitted to the Apex operation circuit 20.

The Apex operation circuit 20 carries out Apex operation known per se from the selected reference output and various information (minimum F-number information, diaphragm information, shutter speed information, film sensitivity information etc.) received from a reference output/information setting portion 21. Operation output signal thus obtained is transmitted from the Apex operation circuit 20 to a display control circuit 22 and an exposure control circuit 23.

The display control circuit 22 displays the proper diaphragm value or the proper shutter speed obtained by the Apex operation. The exposure control circuit 23 controls the diaphragm or the shutter to set it to the obtained proper diaphragm value of shutter speed.

A display 51 is provided to let the photographer know which reference output is now selected. The display 51 puts display element 51a on when the gate 15 is opened, display element 51b on when the gate 16 is opened and display element 51c on when the gate 17 is opened.

When the photographer wishes to take a picture with priority of an object present on the high birghtness side over other objects, he operates first setting means 25. When he wishes to take a picture with priority of an object on the low brightness side over other objects, he operates second setting means 26.

24 is a shift circuit which receives from the selection circuit 19 signals PH, PM and PL for selecting and controlling the first, second and third reference outputs respectively, and issues control signals qH, qM and qL for opening the first reference output gate, the second reference output gate and the third reference output gate respectively in response to the inputs applied thereto from said first and second setting means 25 and 26.

Figure 5:
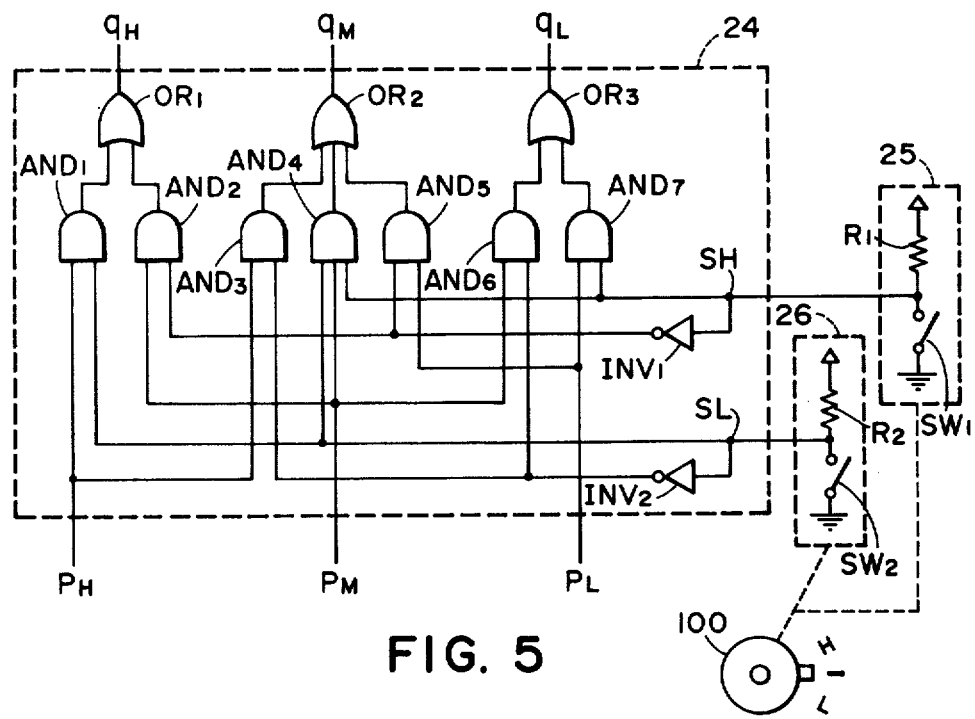
FIG. 5 is a circuit diagram of the shift circuit and setting means shown in FIG. 4.

FIG. 5 shows the details of the above shift circuit 24 and said first and second setting means 25, 26.

Said first and second setting means 25 and 26 comprise switches SW1 and SW2 pulled up by resistors R1 and R2 respectively, and a setting dial 100 for selectively closing the switches SW1 and SW2. By turning the dial 100, one can select any one of three different dial positions "H", "-" and "L". When the dial 100 set to "H", the switch SW1 is closed for high brightness priority mode and when the dial is set to "L" the switch SW2 is closed for low brightness priority mode. When the dial 100 is set to "-", neither SW1 nor SW2 is closed but these two switches SW1 and SW2 remain opened, which is normal mode. In the position of normal mode, the selection of reference output is left to the camera alone.

The shift circuit 24 comprises AND gates AND-1–AND7, OR gates OR1–OR3 and inverters INV1 and INV2 and receives from the selection circuit 19 signals PH, PM, PL and from setting means 25, 26 output shift signals SH, SL. The output shift signal SH issued from said first setting means 25 is "1" for normal mode and it becomes "0" at shift to high brightness side. The output shift signal SL issued from said second setting means 26 is "1" for normal mode and it becomes "0" at shift to low brightness side.

The manner of operation of the above apparatus is as follows:

(1) Selection circuit 19 is in the position to select the high brightness side:

In this position, PH="1" and PM=PL="0" ... (1)

For normal mode, SH=SL="1". Only the outputs of AND1 and OR1 become "1". Namely, qH="1". Therefore, the gate circuit 15 is opened to select the first reference output.

Turn the dial 100 to the position of mark "L". Then, the shift signal SL="0". The output of AND1 becomes "0" whereas the outputs of INV2, AND3 and OR1 become all "1". Consequently, qM="1". Thereby the gate circuit 16 is opened and the second reference output is selected.

If the dial 100 is turned to the position of mark "H" under the state represented by the above formula (1), then the control signal qH remains unchanged, that is, qH="1" because only the outputs of AND1 and OR1 are "1". In this manner, when the high brightness reference output is first selected, shift to a higher brightness level is inhibited.

(2) Selection circuit 19 is in the position to select the average reference output:

In this position,

PH="0", PM="1" and PL="0" ... (2)

For normal mode, SH=SL="1". Only the outputs of AND4 and OR2 become "1". Thus, qM="1". Therefore, the gate circuit 16 is opened to select the second reference output.

Under the above condition, if the dial 100 is turned to the position of "H", then the output from first setting means 25, that is, the shift signal SH becomes "0". As SH="0", the output of INV1 becomes "1". The outputs of AND2 and OR1 become "1". Thus, qH="1" and therefore the high brightness reference output is selected.

If the dial 100 is turned to the position of "L", then the output from second setting means 26 is turned to "0". Namely, the shift signal SL="0". The output of INV2 becomes "1" and therefore only the outputs of AND6 and OR3 become "1". Consequently, qL="1" and the gate 17 is opened to select the third reference output.

(3) Selection circuit 19 is in the position to select the low brightness side:

In this position, PH=PM="0" and PL="1" ... (3)

For normal mode, SH=SL="1". Therefore, only the outputs of AND7 and OR3 are "1". Consequently, qL="1" and the reference output on the low brightness side is selected.

Under the above condition, if the dial 100 is turned to the position of "H", then the output from first setting means 25, namely shift signal SH is turned to "0". As SH="0", the output of INV1 becomes "1". The outputs of AND5 and OR2 become "1". Consequently, qM="1" and the mean reference output is selected.

Turning of the dial 100 to the position "L" produces no change of the above state in this case. The outputs of AND7 and OR3 remain unchanged at "1" and also qL="1" as it was before turning the dial to "L". Therefore, the first selected low brightness reference output remains active. It can not be further shifted toward a lower level.

In connection with the above description it should be noted that the first and third reference outputs are not always necessary to be Pmax and Pmin.

Figure 6:
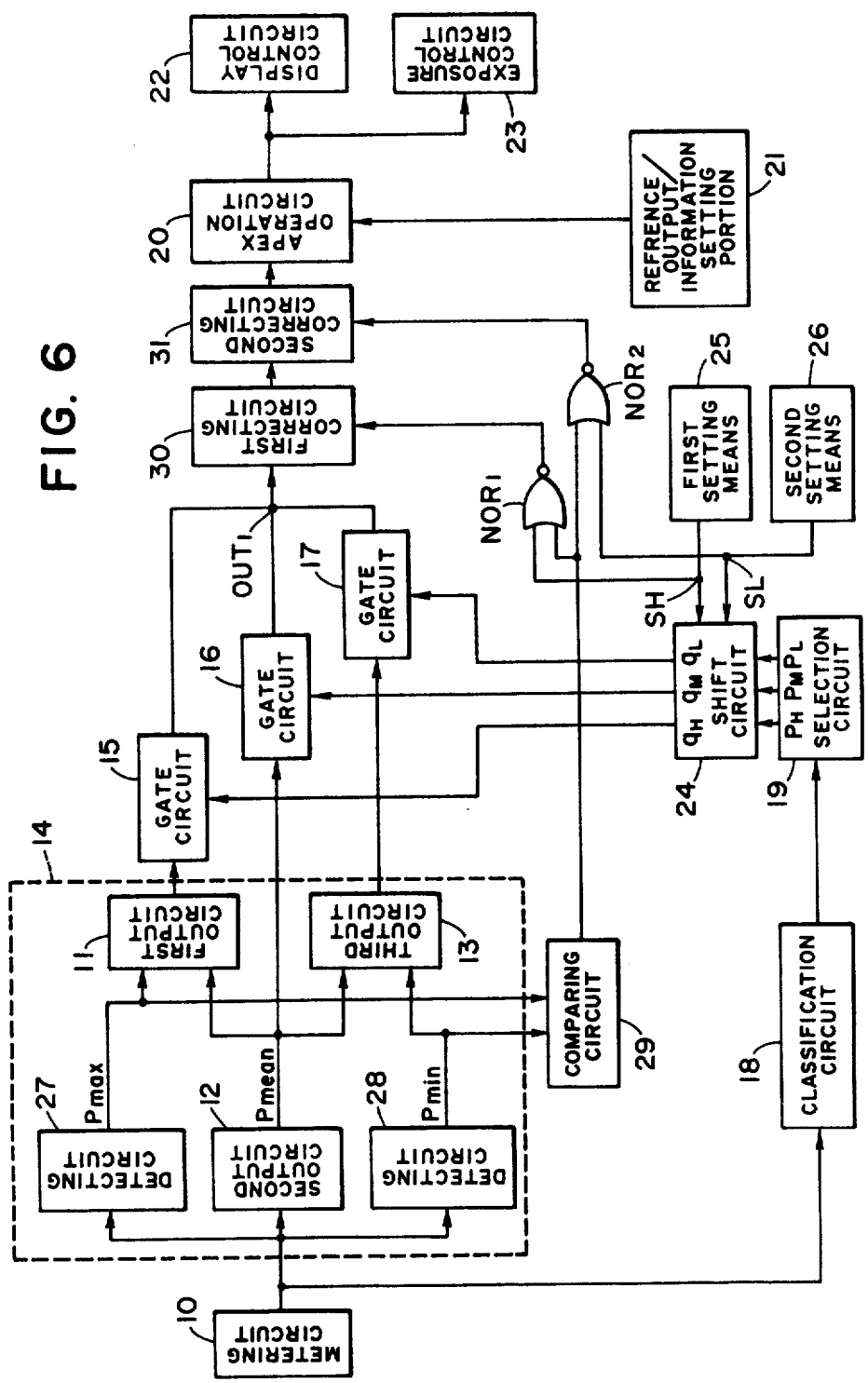
FIG. 6 is a block diagram showing another embodiment of the invention.

FIG. 6 shows another embodiment of the present invention.

The second embodiment shown in FIG. 6 includes two detecting circuits 27 and 28. The detecting circuit 27 detects the maximum value of measured outputs from the metering circuit 10 and issues it as output Pmax. The detecting circuit 28 detects the minimum value of the measured outputs from the metering circuit 10 and issues it as output Pmin. A mean value of the measured outputs is issued from the second output circuit 12 as output Pmean. In this embodiment, the first reference output is a mid value between Pmax and Pmin and is obtained by arithmetic operation. The third reference output is a mid value between Pmean and Pmin and also obtained by arithmetic operation.

The output Pmax of the detecting circuit 27 and the output Pmin of the detecting circuit 28 are introduced into a comparing circuit 29 which includes a circuit for generating a reference output $\alpha$ corresponding to about 1 Ev. The comparing circuit 29 operates to determine the brightness difference $\Delta P$ (if not logarithmetically compressed, it corresponds to the object brightness ratio) according to the following equation (4):

$$\Delta P = Pmax - Pmin \qquad (4)$$

The found brightness difference $\Delta P$ is compared with the constant value $\alpha$ in the comparing circuit 29.

When $\Delta P \leq \alpha$ \qquad (5), the output of the comparing circuit 29 becomes "0".

When $\Delta P > \alpha$ \qquad (6), the output of the comparing circuit becomes "1".

NOR gate NOR1 receives the output of the comparing circuit 29 and the output of first setting means 25, and controls a first correcting circuit 30. Similarly, NOR gate NOR2 receives the output of the comparing circuit 29 and the output of second setting means 26 to control a second correction circuit 31.

The first correcting circuit 30 has an output equal to the input so long as the output of NOR1 is "0". Therefore, the correction value is 0 in this case. However, when the output of NOR1 becomes "1", the first correcting circuit 30 adds a correction value $\delta H$ to the input and shifts the output at output point OUT1 to the high brightness side.

The second correction circuit 31 has an output equal to the input so long as the output of NOR2 is "0". Therefore, the correction value is 0 in this case. However, when the output of NOR2 becomes "1", the second correction circuit 31 subtracts a correction value $\delta L$ from the input and shifts the output at output point OUT1 to the low brightness side.

The manner of operation of the above apparatus is as follows:

When the above relation (6) holds, both NOR1 and NOR2 receive "1" from the comparing circuit 29 and the outputs of the NOR gates are both "0". Therefore, the first and second correction circuits carry out no correction. In this case, reselection of reference output can be made by turning the dial 100 in the same manner as described above in connection with FIG. 4 embodiment.

When the above relation (5) holds, the output of the comparing circuit is "0". Under that condition, if the dial 100 shown in FIG. 5 is turned to the position of "H", then the shift signal SH from the first setting means 25 is turned to "0". As SH="0", the output of NOR1 becomes "1". The first correcting circuit 30 shifts the brightness toward the high brightness side by δH. Since the second setting means 26 is not actuated at the same time, the correction value given by the second correction circuit 31 is 0. Therefore, the total correction value given by the correcting circuits 30 and 31 is δH (underexposure).

If the dial 100 is turned to the position of "L" when the above relation (5) holds and the output of the comparing circuit 29 is "0", then the shift signal SL from second setting means 26 is turned to "0". As SL="0", the output of NOR2 becomes "1" and therefore the second correction circuit 31 shifts the brightness value toward the low brightness side by δL. Since the first setting means 25 remains unactuated at that time, the correction value given by the first correcting circuit 30 is 0. Therefore, the total correction value given by the correcting circuits 30 and 31 is δL (overexposure).

In this embodiment, the shift signal SH or SL brings also the shift circuit 24 into operation. Therefore, the following operation is carried out in the apparatus in addition to the above described operations:

When the relation (5) holds and further the dial 100 is turned to the postion of "H", the previously selected reference output, the second reference output or the third reference output is changed over to the first reference output or the second reference output by reselection. Further, the correction value δH is added to the reference output. This means that, when the previously selected reference output is the first reference output, the correction value δH is added to the first reference output and then shifted further toward the high brightness side. On the contrary, when the relation (5) holds and further the dial 100 is turned to the position of "L", the previously selected reference output, the first reference output or the second reference output is changed over to the second reference output or the third reference output by reselection. The correction value δL is subtracted from the reference output and then the latter is shifted further toward the low brightness side. If the previously selected reference output is the third reference output, the latter is further reduced by the subtraction of correction value δL from it.

Even if the above operation is carried out, it does not cause any particular problem on the exposure correction. The reason for this is that, in such case, ΔP is small and therefore there is no substantial difference between the previously selected reference output and the reselected reference output. The resulting amount of exposure correction from the above operation is a value given by adding δH to or subtracting δL from the difference between the firstly selected reference output and the secondly selected reference output. Therefore, in the case where the above relation (5) holds, a similar effect of correction as above may be obtained by using only the correction value δH' or δL' by the correcting circuit 30 or 31 without any reselection of reference output.

The case in which the above relation (5) holds and the photographer has to turn the dial 100 to the position of "H" occurs for such scene in which the main object is present within the high brightness area and occupies a small portion of one of the divisional areas individually measured. In such case, the brightness value of the main object is larger than Pmax. Therefore, a mere selection of the reference output on the high brightness side is insufficient to attain the aimed purpose of exposure correction. It is attained by further shifting the selected value toward the high brightness side by a value (about 1 [Ev]) predetermined taking into account the film latitude.

The case where the above relation (5) holds and the photographer has to turn the dial 100 to the position of "L" occurs for such scene in which the main object is present within the low brightness part and occupies a small portion of one of the divisional areas individually measured. In such case, the brightness value of the main object is smaller than Pmin. Therefore, a mere selection of the reference output on the low brightness side is insufficient to attain the purpose of exposure correction. The purpose can be attained by shifting the selected value further toward the low brightness side by a certain value (1.5-2 [Ev]) predetermined taking the film latitude into consideration.

Figure 7:
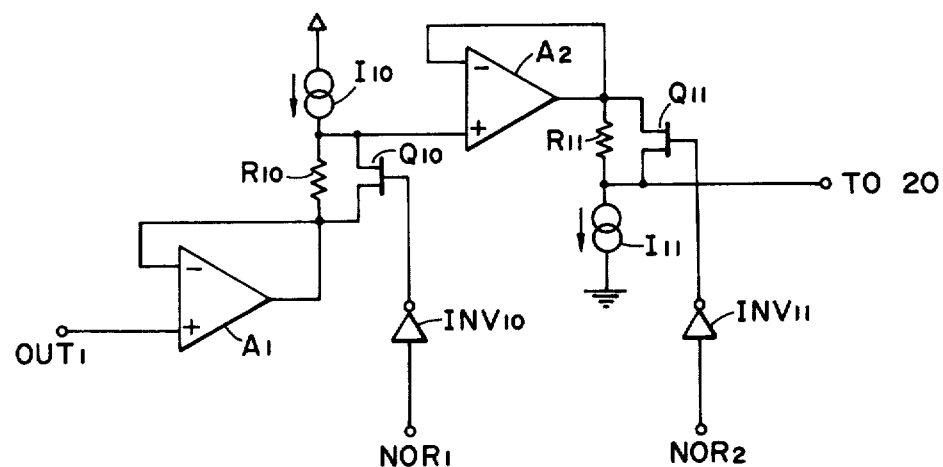
FIG. 7 is a circuit diagram showing an embodiment of the correcting circuit shown in FIG. 6.

FIG. 7 shows an embodiment of the correction circuit 30, 31 formed as an analog circuit according to the invention.

Referring to FIG. 7, the first correcting circuit 30 comprises an operational amplifier A1, a constant current source I10, a correction resistor R10 (for setting δH), an inverter INV10 and an field effect transistor (FET) Q10. The second correction circuit 31 comprises an operational amplifier A11, a constant current source I11, a correction resistor R11 (for setting δL), an inverter INV11 and a field effect transistor Q11.

When the outputs of NOR gates NOR1 and NOR2 are "0", both of FET Q10 and Q11 are On. Therefore, neither addition of δH nor subtraction of δL is carried out.

When NOR1 puts out "1" and NOR2 puts out "0", FET Q10 is turned Off and FET Q11 On. Consequently, the correction value δH is added. When NOR1 puts out "0" and NOR2 puts out "1", FET Q10 is turned On and FET Q11 Off. Consequently, the correction value δL is subtracted.

Figure 8:
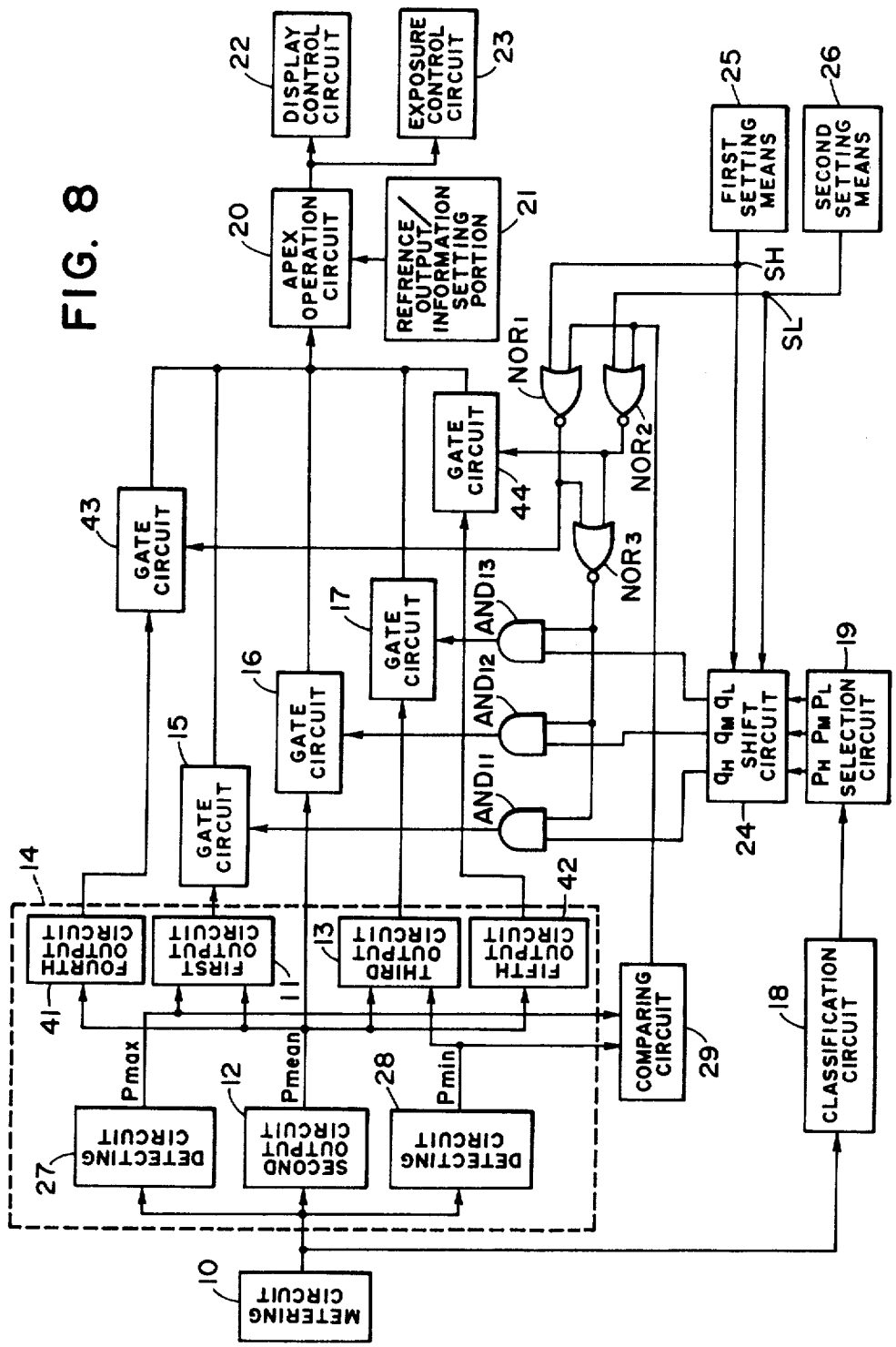
FIG. 8 is a block diagram showing a further embodiment of the invention.

FIG. 8 is a block diagram showing a further embodiment of the invention.

This embodiment includes a fourth output circuit 41 and a fifth output circuit 42 to produce a fourth reference output and a fifth reference output.

The fourth output circuit 41 receives the output of the second output circuit 12, that is, the mean value Pmean and issues a value as given by shifting the input toward the high brightness side by a correction value δH, namely Pmean+δH as the fourth reference output. When the output of NOR1 is "1", a gate circuit 43 transmits the fourth reference output Pmean+δH to the Apex operation circuit 20.

The fifth output circuit 42 also receives the output of the second output circuit 12, namely Pmean. A value as given by subtracting a correction value δL from the input, namely Pmean—δL is issued from the fifth output circuit 42 as the fifth reference output. The fifth reference output Pmean—δL is transmitted to the Apex operation circuit 20 through a gate circuit 44 when the output of NOR2 is "1".

When the brightness difference is so small that the above relation (5) may hold, then $$Pmean + \delta H > Pmax \qquad (7)$$

$$Pmean - \delta L < Pmin \qquad (8)$$

For normal mode, the shift signals of first and second setting means 25 and 26 are "1". As the shift signal SH=SL="1", the outputs of NOR1 and NOR2 are "0". Therefore, the gate circuits 43 and 44 do not open and the output of NOR3 becomes "1" AND gates AND1, AND2 and AND3 have "1" at their one input. Consequently, the gate selected by the selection circuit 19 and the shift circuit 24 is allowed to open.

When there is a brightness difference larger than the determined value and the relation of the above formula (6) holds, the output of the comparing circuit 29 is "1". The outputs of NOR1 and NOR2 become both "0" and therefore the same result as above is obtained.

If the dial 100 is turned to the position of "H" to select the high brightness side under the state in which the relation (5) holds, then the shift signal of first setting means 25 becomes "0". Namely, SH="0". Therefore, the output of the comparing circuit 29 becomes also "0" and the output of NOR1 becomes "1". Thereby the outputs of AND11–AND13 are all turned to "0". None of the first–third reference outputs is now selected but the gate 43 is opened to transmit the fourth reference output Pmean+δH to the Apex operation circuit 20.

If the dial 100 is turned to the position of "L" to select the low brightness side under the state in which the relation (5) holds, then the shift signal of second setting means 26 becomes "0". Namely, SL="0". Therefore, the output of the comparing circuit 29 becomes also "0" and the output of NOR2 becomes "1". The outputs of AND11–AND13 become all "0". In this position, none of the first–third reference outputs is now selected. Instead, the gate 44 is opened and the fifth reference output Pmean−δL is transmitted to Apex operation circuit 20.

In this manner, this embodiment has the same effect as the previously described FIG. 6 embodiment.

In the above embodiment, the outputs of the fourth and fifth output circuits 41 and 42 have been formed on the basis of Pmean and by shifting it. However, when the brightness difference is so small that the relation (5) may hold, then $$Pmax \approx Pmean \approx Pmin \tag{9}$$

Therefore, the fourth and fifth reference outputs may be formed also on the basis of Pmax and Pmin and by shifting them with a small change of δH and δH.

While the invention has been particularly shown and described with reference to preferred embodiments thereof, it will be understood by those skilled in the art that the foregoing and other changes in form and details can be made therein without departing from the spirit and scope of the invention.

What I claim is:

1. In an exposure control apparatus including means for producing a plural number of reference outputs having different output levels each depending on a plural number of measured photometric outputs obtained by photometrically and individually measuring lights from a plural number of divided areas of an object field, each photometric output corresponding to each of said divided areas, and selection means for selecting one of said reference outputs so as to control the exposure value for taking a picture of said object field in accordance with said selected reference output, the inprovement comprising:

means for changing the exposure value controlled by said exposure control apparatus, said changing means including means for issuing a signal indicating the direction in which the control should be made selectively to increase or decrease the exposure value and reselection means operable in response to said indicating signal for reselecting a reference output suitable for carrying out the control in the indicated direction among said plural number of reference outputs, whereby said exposure control apparatus controls the exposure value in accordance with said reselected reference output instead of said selected reference output.

2. An exposure control apparatus as set forth in claim 1 wherein said reselection means puts out the reference output selected by said selection means whenever there is no reference output suitable for carrying out for the control in the indicated direction among said plural number of reference outputs.

3. An exposure control apparatus as set forth in claim 1 wherein said selection means includes gate circuits provided corresponding to said plural number of reference outputs produced from said producing means and a selection circuit for generating a control signal to be selectively applied to the gate circuits to operate the control signal applied gate circuit, and wherein said reselection means includes a shift circuit disposed between said selection circuit and gate circuits to change the selection of the gate circuit to which said control signal from said selection circuit should be applied.

4. In an exposure control apparatus including means for producing a plural number of reference outputs having different output levels each other depending on a plural number of measured photometric outputs obtained by photometrically and individually measuring lights from a plural number of divided areas of an object field, each photometric output corresponding to each of said divided areas, and selection means for selecting one of said reference outputs so as to control the exposure value for taking a picture of said object field in accordance with said selected reference output, the improvement comprising:

means for changing the exposure value controlled by said exposure control apparatus, said changing means including means for issuing a signal indicating the direction in which the control should be made selectively to increase or decrease the exposure value and correction means operable in response to said indicating signal to add a predetermined level of correction to said selected reference output in order to carry out the control in the indicated direction, whereby said exposure control apparatus controls the exposure value in accordance with said selected reference output corrected by said correction means.

5. In an exposure control apparatus as set forth in claim 4, said improvement further comprises means for comparing said plural number of measured outputs with each other and producing an output only when the difference between the maximum measured output and the minimum measured output is lower than a predetermined value, and wherein said changing means is operable in response to the output of said comparing means.

6. An exposure control apparatus as set forth in claim 5 wherein said correction means includes a correction circuit connected with said selection means and a driving circuit for operating said correction circuit in response to the output of said comparing means and said indicating signal.

7. In an exposure control apparatus including means for producing a plural number of reference outputs having different output levels each other depending on a plural number of measured photometric outputs obtained by photometrically and individually measuring lights from a plural number of divided areas of an object field, each photometric output corresponding to each of said divided areas, and selection means for selecting one of said reference outputs so as to control the exposure value for taking a picture of said object field in accordance with said selected reference output, the improvement comprising:

means for changing the exposure value controlled by said exposure control apparatus, said changing means including means for issuing a signal indicating the direction in which the control should be made selectively to increase or decrease the exposure value, means for producing at least two correction outputs by adding a predetermined level of correction to at least one of said plural number of reference outputs and means operable in response to said indicating signal to select a correction output suitable for carrying out the control in the indicated direction and put out said correction output instead of said selected reference output.

* * * * *